G. A. BOSWORTH.
AUXILIARY AIR PUMP FOR LOCOMOTIVE ENGINES.
APPLICATION FILED MAR. 21, 1911.
1,036,179.
Patented Aug. 20, 1912.
2 SHEETS—SHEET 2.
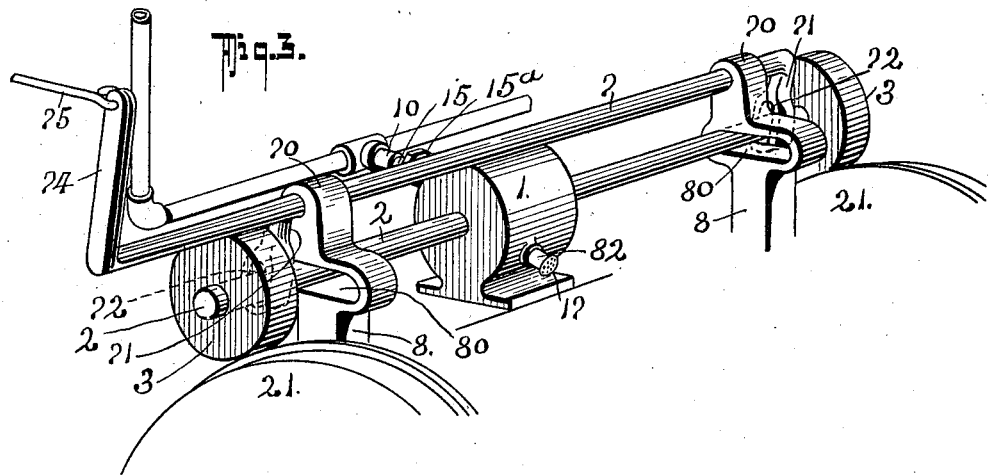
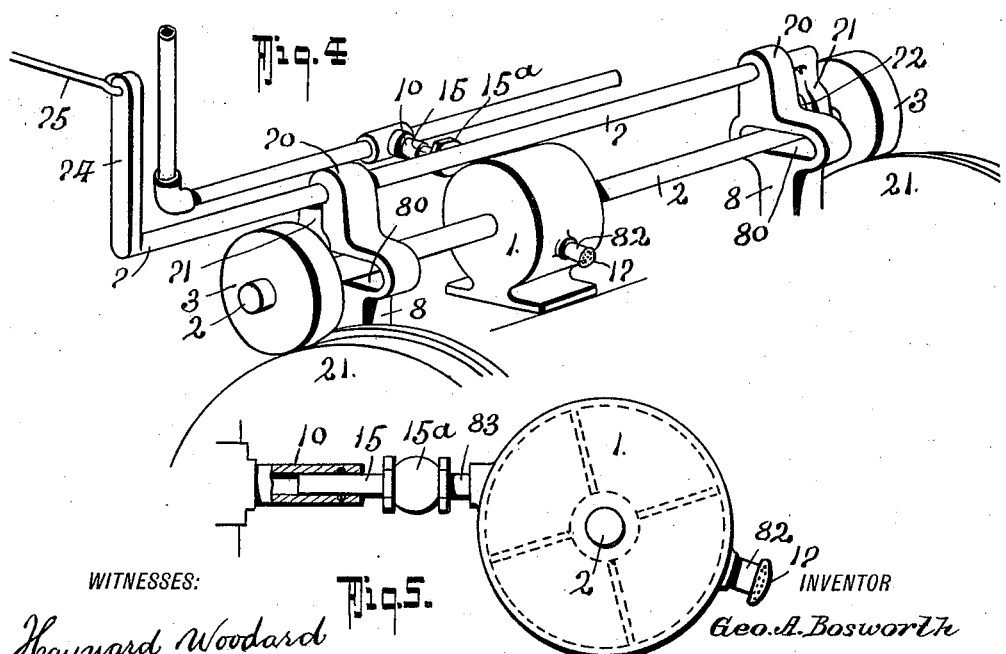
WITNESSES:
Haynard Woodard
Charles H. Wagner
INVENTOR
Geo. A. Bosworth
BY
Fred G. Dieterich
ATTORNEY

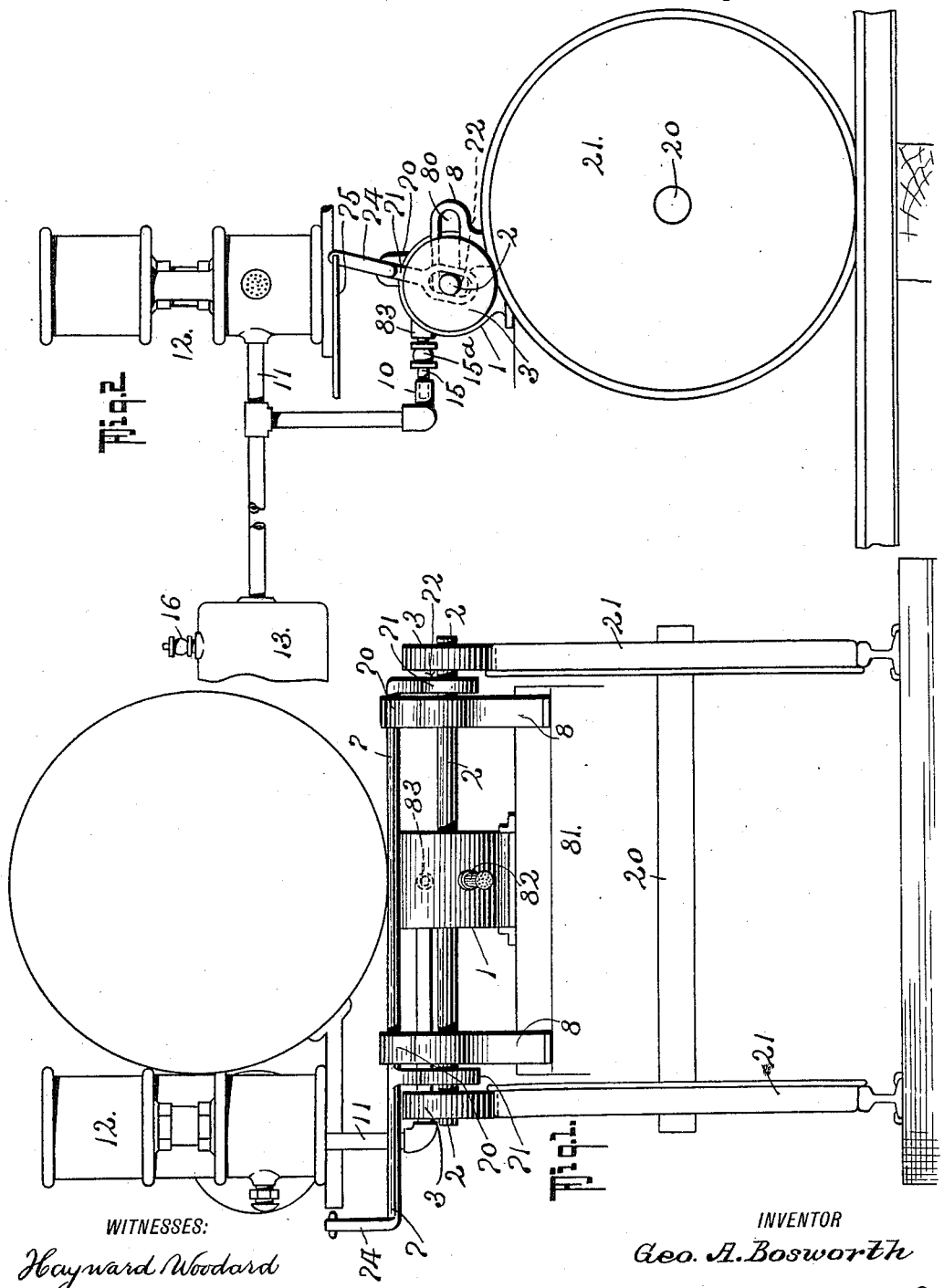

UNITED STATES PATENT OFFICE.

GEORGE A. BOSWORTH, OF LINCOLN, NEBRASKA.

AUXILIARY AIR-PUMP FOR LOCOMOTIVE-ENGINES.

1,036,179.  Specification of Letters Patent.  Patented Aug. 20, 1912.

Application filed March 21, 1911. Serial No. 615,830.

*To all whom it may concern:*

Be it known that I, GEORGE A. BOSWORTH, a citizen of the United States, residing at Lincoln, in the county of Lancaster and State of Nebraska, have invented a new and Improved Auxiliary Air-Pump for Locomotive-Engines, of which the following is a specification.

This invention, which relates generally to air brake controlling means, is more particularly designed as an auxiliary pumping means and as a safety attachment on locomotive engines, adapted for being readily put into action for charging the main air reservoir to maintain it at its full capacity when the regular air pump or pumps of air brake systems become disabled, and fail to operate.

Primarily my invention has for its object to provide a mechanism of the character stated that is of a simple and economical construction, that can be quickly coupled with the usual type of air brake reservoirs, and the running gear of the engine, is easily controlled from the engine cab and shifted to instantly become operative for storing up the air in the main reservoir whenever the regular pumping means fails to work.

With other objects in view that will be hereinafter referred to, my invention consists in the peculiar combination and novel arrangement of parts hereinafter described, specifically pointed out in the appended claim and illustrated in the accompanying drawings, in which:—

Figure 1, is a view of so much of the front end of a locomotive engine necessary to show the practical position and arrangement of my invention. Fig. 2, is a side elevation thereof. Fig. 3, is a perspective view of the shifting clutch devices for frictionally connecting with the oppositely disposed engine wheels, the parts being at the released position. Fig. 4, is a similar view of the said parts, the same being shown shifted to engage with and be driven by the wheel for operating the auxiliary or safety pumping means. Fig. 5 is a detail elevation and part section of a portion of the invention.

In carrying out my invention, I employ a shaft 2, that is held parallel with the axle or shaft 20 of a pair of the running wheels 21—21, and the said shaft 2 is mounted to slide in the longitudinal line of the engine body. Shaft 2, see Fig. 2, is journaled in the horizontal slots 80, of a pair of brackets 8 that rise up from the engine truck bed 81.

1 designates an air pump that is mounted on and coöperates with the shaft 2, it having the usual air intake 82 and an outlet 83, that has a tube-like nozzle 15 that has a telescopic and air-tight connection with an air pipe 10 that joins with the air pipe 11 that leads the air from the main pump 12 to the reservoir 13.

$15^a$ designates a check valve in the air outlet from the pump 1 and 17 indicates an air strainer at the intake to the pump 1.

3—3 designate friction wheels mounted on the opposite ends of the shaft 2 of the pump 1 and 7 designates a rocker rod journaled in bearings 70 on the brackets 8 and the said rod has pendent crank members 71—71, the lower or head ends of which have elongated slots 72 to receive the friction rollers 3, on the shaft 2.

74 designates an upwardly extended crank arm on rod 7, with which is joined a link rod 75 that extends to and is operable from within the engine cab.

16 designates a pop or blow off valve on the main reservoir for relieving excess pressure in the said reservoir.

From the foregoing description, taken in connection with the accompanying drawings, the manner in which my invention is operated and its advantages will be readily understood.

When in the normal condition, the auxiliary pumping devices are out of gear, the rollers and the pump shaft being set back away from the wheel rims. To set the said auxiliary pump into action it is only necessary to rock the crank rod in the direction indicated by the arrow on Fig. 2, which shifts the entire auxiliary pump mechanism and brings the rollers on the said pump shaft into frictional engagement with the rims of the wheels which rotates the said pump shaft and thereby causes the pump to charge the main air reservoir.

What I claim is:

In a safety attachment for air brake systems, the combination with the reservoir, the vehicle truck and supports adjacent the truck wheels, said supports having horizontal slot bearings; of a rotary pump, the shaft of which supports the pump casing and extends laterally from both sides of the casing, the outer ends of the pump being slidably mounted in the slotted bearings, friction rollers on the shaft for engaging the truck wheels, and means for bodily shifting the pump mechanism for bringing the friction rollers into and out of gear with the vehicle wheels, said means comprising a crank rod coupled with the pump shaft and lever devices for rocking the said shaft.

GEORGE A. BOSWORTH.

Witnesses:
 EMMA J. HEDGES,
 FRED D. THOMPSON.